United States Patent
Okoshi et al.

(10) Patent No.: US 10,030,137 B2
(45) Date of Patent: Jul. 24, 2018

(54) INTERMEDIATE FOR RESIN MOLDED ARTICLE AND RESIN MOLDED ARTICLE

(71) Applicant: FUJI XEROX CO., LTD., Tokyo (JP)

(72) Inventors: Masayuki Okoshi, Kanagawa (JP); Tsuyoshi Miyamoto, Kanagawa (JP)

(73) Assignee: FUJI XEROX CO., LTD., Tokyo (JP)

(*) Notice: Subject to any disclaimer, the term of this patent is extended or adjusted under 35 U.S.C. 154(b) by 214 days.

(21) Appl. No.: 14/988,235

(22) Filed: Jan. 5, 2016

(65) Prior Publication Data
US 2017/0037237 A1    Feb. 9, 2017

(30) Foreign Application Priority Data

Aug. 4, 2015   (JP) .................................. 2015-154287

(51) Int. Cl.
| | | |
|---|---|---|
| B32B 27/38 | (2006.01) | |
| B32B 27/34 | (2006.01) | |
| B32B 27/12 | (2006.01) | |
| B32B 27/04 | (2006.01) | |
| C08L 63/00 | (2006.01) | |

(52) U.S. Cl.
CPC .................................... C08L 63/00 (2013.01)

(58) Field of Classification Search
None
See application file for complete search history.

(56) References Cited

U.S. PATENT DOCUMENTS

| | | | | |
|---|---|---|---|---|
| 4,735,833 A | * | 4/1988 | Chiotis | C08J 3/241 156/155 |
| 5,169,710 A | * | 12/1992 | Qureshi | C08J 5/04 428/408 |
| 5,352,741 A | * | 10/1994 | Dierickx | H01B 3/305 525/178 |
| 2014/0228519 A1 | | 8/2014 | Nakayama et al. | |
| 2015/0210813 A1 | | 7/2015 | Arai et al. | |

FOREIGN PATENT DOCUMENTS

| | | | | |
|---|---|---|---|---|
| JP | 2002-128989 A | * | 5/2002 | ............. C08L 63/00 |
| JP | 2013-231178 A | | 11/2013 | |
| JP | 2014-040566 A | | 3/2014 | |

OTHER PUBLICATIONS

Machine translation of JP 2002-128989 A (no date).*
Safety Data Sheet for TECHNOMELT PA 6301, provided by Henkel (2014).*

* cited by examiner

*Primary Examiner* — Michael J Feely
(74) *Attorney, Agent, or Firm* — Oliff PLC

(57) ABSTRACT

An intermediate for a resin molded article includes a curable epoxy resin, a reinforcing fiber, and a resin including at least one of an amide bond and an imide bond.

12 Claims, 1 Drawing Sheet

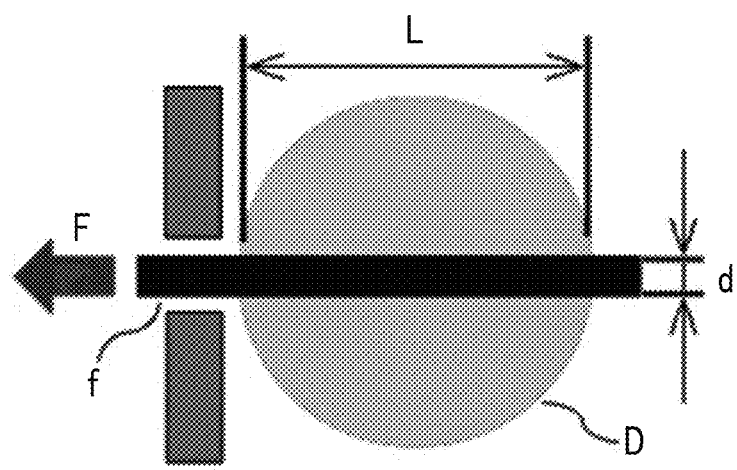

INTERMEDIATE FOR RESIN MOLDED ARTICLE AND RESIN MOLDED ARTICLE

CROSS-REFERENCE TO RELATED APPLICATIONS

This application is based on and claims priority under 35 USC 119 from Japanese Patent Application No. 2015-154287 filed Aug. 4, 2015.

BACKGROUND

1. Technical Field

The present invention relates to an intermediate for a resin molded article and a resin molded article.

2. Related Art

In the related art, a resin molded article including a reinforcing fiber is used for various components and housings of home appliances or automobiles, housings of business equipment and electric and electronic equipment, members of airplanes or spacecrafts, and the like.

SUMMARY

According to an aspect of the invention, there is provided an intermediate for a resin molded article including:
a curable epoxy resin;
a reinforcing fiber; and
a resin including at least one of an amide bond and an imide bond.

BRIEF DESCRIPTION OF THE DRAWINGS

Exemplary embodiments of the present invention will be described in detail based on the following FIGURE, wherein:

FIG. 1 is a diagram schematically illustrating a test using a micro-droplet method.

DETAILED DESCRIPTION

Hereinafter, exemplary embodiments of an intermediate for a resin molded article and a resin molded article according to the invention are provided.

[Intermediate for Resin Molded Article]

An intermediate for a resin molded article according to the exemplary embodiment includes a thermal curable epoxy resin, a reinforcing fiber, and a resin including at least one of an amide bond and an imide bond.

Hereinafter, a resin including at least one of an amide bond and an imide bond is referred to as a "specific resin".

Here, the intermediate for the resin molded article according to the exemplary embodiment is one for obtaining a desired resin molded article through a certain molding step (for example, heating and pressurizing steps such as press molding and mold molding).

Recently, in order to obtain a resin molded article having excellent mechanical strength, an intermediate for a resin molded article including a thermal curable epoxy resin and a reinforcing fiber is used.

In the case where the affinity between the reinforcing fiber and the epoxy resin in the resin molded article is low, there may be some cases where an empty space is formed in the interface therebetween, such that adhesiveness in such an interface decreases. With respect to the resin molded article having low adhesiveness in the interface, the mechanical strength thereof, particularly, a flexural modulus decreases.

The intermediate for the resin molded article according to the exemplary embodiment includes a thermal curable epoxy resin, a reinforcing fiber, and a resin (specific resin) including at least one of an amide bond and an imide bond.

If these components are included, it is possible to obtain a resin molded article in which adhesiveness in the interface between the reinforcing fiber and the resin component is excellent, and a decrease of a flexural modulus is prevented. The mechanism that may obtain this effect is not clear, but it is assumed to be as follows.

The reinforcing fiber and the specific resin have characteristics in that the both are easily subjected to physical attachment by chemical attraction between a polar group existing on the surface of the reinforcing fiber and an amide bond or an imide bond in a molecule of the specific resin.

As in the intermediate for the resin molded article according to the exemplary embodiment, in the case where a thermal curable epoxy resin, a reinforcing fiber, and a specific resin exist together, the specific resin is more easily collected near the reinforcing fiber than the thermal curable epoxy resin, and, as a result, a covering layer is formed around the reinforcing fiber by the specific resin.

In addition, when the thermosetting epoxy resin is thermally cured, since a reaction occurs between an amide bond in a specific resin or a carboxyl group of a polyamic acid (precursor) and a portion of a thermal curable epoxy resin, adhesiveness between an epoxy resin after curing and a specific resin becomes satisfactory.

As described above, the intermediate for the resin molded article according to the exemplary embodiment has a configuration in which a covering layer composed of a specific resin is formed around a reinforcing fiber after thermal curing, and a portion of this covering layer and a portion of an epoxy resin are bonded.

Accordingly, it is assumed that, since all of the intermediate for the resin molded article after thermal curing and the resin molded article obtained by using the intermediate for the resin molded article have high adhesiveness (high interface shearing strength described below) of the interface between the reinforcing fiber and the epoxy resin, a resin composition article in which mechanical strength, particularly, a flexural modulus is excellent is obtained.

Hereinafter, details of respective components of the intermediate for the resin molded article are described.

—Curable Epoxy Resin—

The curable epoxy resin is a component which is a base material of a resin molded article and becomes an epoxy resin reinforced by reinforcing fibers.

The curable epoxy resin is a thermal curable epoxy resin and an ultraviolet ray curable epoxy resin, but a thermal curable epoxy resin is preferable from the viewpoint of accelerating a curing rate with being less affected by the thickness of a desired product.

Hereinafter, a thermal curable epoxy resin which is very appropriate for the exemplary embodiment is described.

The thermal curable epoxy resin is not particularly limited, as long as the thermal curable epoxy resin is a compound having two or more epoxy groups, and examples thereof include monomers, oligomers, and the whole polymers, which have two or more epoxy groups in one molecule, and molecule amounts or molecule structures thereof are not particularly limited.

Specific examples of the thermal curable epoxy resin include a biphenyl-type epoxy resin, a bisphenol-type epoxy resin, a stilbene-type epoxy resin, a phenol novolak-type epoxy resin, a cresol novolak-type epoxy resin, a triphenolmethane-type epoxy resin, an alkyl-modified triphenolmethane-type epoxy resin, a triazine nucleus-containing epoxy resin, a dicyclopentadiene-modified phenol-type epoxy resin, and a phenolaralkyl-type epoxy resin (having a phenylene skeleton, a diphenylene skeleton, or the like).

The thermal curable epoxy resin may be used singly, or plural types thereof may be used in combination.

Among these, in view of further improvement of a flexural modulus and heat resistance, a thermal curable epoxy resin containing an aromatic group is preferable, and a thermal curable epoxy resin containing phenol is more preferable.

A molecular weight and a viscosity of the thermal curable epoxy resin are not particularly limited, and may be determined according to a type of the resin, a molding condition, or a use of the resin molded article.

For example, in view of fluidity, the weight average molecular weight (Mw) of the thermal curable epoxy resin is preferably in the range of 300 to 100,000, and more preferably in the range of 500 to 10,000.

For example, in view of a curing rate, the epoxy equivalent of the thermal curable epoxy resin is preferably 100 to 50,000, and more preferably 100 to 5,000.

The weight average molecular weight of the thermal curable epoxy resin is measured by the following methods.

The weight average molecular weight is measured using a high speed GPC apparatus HLC-8320GPC manufactured by Tosoh Corporation (a detector is RI and UV) with tetrahydrofuran (THF) as a solvent. In addition, a reference material is polystyrene.

The content of the curable epoxy resin may be determined depending on the use of the obtained resin molded article. For example, the content of the curable epoxy resin is preferably 10 parts by weight to 80 parts by weight, more preferably 10 parts by weight to 70 parts by weight, and still more preferably 10 parts by weight to 60 parts by weight with respect to the total weight of the intermediate for the resin molded article according to the exemplary embodiment.

—Reinforcing Fiber—

As the reinforcing fiber, a well-known reinforcing fiber which is applied to the intermediate for the resin molded article is used. Examples thereof include a carbon fiber, a glass fiber, a metal fiber, and an aramid fiber.

The reinforcing fiber may be used singly, or two or more types thereof may be used in combination.

Among these, since affinity with a specific resin is excellent and a flexural modulus is further improved, a carbon fiber is preferable.

The carbon fiber has a carboxyl group on the surface thereof. The carboxyl group and the amide bond or the imide bond included in the molecule of the specific resin form a hydrogen bond, and thus, high affinity is exhibited. Therefore, it is considered that the covering layer composed of the specific resin is easily formed around the carbon fiber and the flexural modulus is further improved.

As the carbon fiber, a well-known carbon fiber is used, and a polyacrylonitrile (PAN) carbon fiber and a pitch carbon fiber are both used.

The reinforcing fiber may be a reinforcing fiber to which a well-known surface treatment is performed.

If the reinforcing fiber is a carbon fiber, examples of the surface treatment include an oxidation treatment and a sizing treatment.

In addition, a fiber diameter and a fiber length of the reinforcing fiber are not particularly limited, and may be selected depending on the use of the resin molded article.

Further, the shape of the reinforcing fiber is not particularly limited, and may be selected according to the molding method of the resin molded article, the use of the resin molded article, and the like. Examples of the shape of the reinforcing fiber include a short fiber, a long fiber, a single fiber, a fiber bundle made with plural single fibers, a product obtained by concentrating fiber bundles, a fabric obtained by two-dimensionally or three-dimensionally weaving fibers, and a product obtained by listing fiber bundles into a sheet shape. Among these, in order to obtain the light-weight resin molded article having excellent durability, a long fiber, a fabric, and the like, which are aligned in one direction, are preferable.

As the reinforcing fiber, commercially available products may be used.

Examples of the commercially available products of the PAN carbon fiber include "TORAYCA (Registered Trademark)" manufactured by Toray Industries, Inc., "TENAX" manufactured by TOHO TENAX Co., Ltd., and "PYROFIL (Registered Trademark)" manufactured by Mitsubishi Rayon Co., Ltd. In addition, commercially available products of the PAN carbon fiber include commercially available products manufactured by Hexcel Corporation, Cytec Industries Inc., Dow-Aksa, and Formosa Plastics Group, and SGL Carbon SE, as commercially available products of the PAN carbon fiber.

Commercially available products of the pitch carbon fiber include "DIALEAD (Registered Trademark)" manufactured by Mitsubishi Rayon Co., Ltd., and "GRANOC" manufactured by Nippon Graphite Fiber Co., Ltd., and "KRECA" manufactured by Kureha Corporation. In addition, the commercially available products of the pitch carbon fiber include commercially available products manufactured by Osaka Gas Chemicals Co., Ltd. and Cytec Industries Inc., as the commercially available products of the pitch carbon fiber.

The content of the reinforcing fiber in the intermediate for the resin molded article according to the exemplary embodiment is preferably 10 parts by weight to 200 parts by weight, more preferably 10 parts by weight to 180 parts by weight, and still more preferably 10 parts by weight to 160 parts by weight with respect to 100 parts by weight of the resin.

If the content of the reinforcing fiber is 10 parts by weight or more with respect to 100 parts by weight of the resin, the resin molded article is reinforced. In addition, if the content of the reinforcing fiber is 200 parts by weight or less with respect to 100 parts by weight of the resin, moldability when the resin molded article is obtained becomes satisfactory.

In addition, if a carbon fiber is used as the reinforcing fiber, it is preferable that the content of the carbon fiber is 10% by weight with respect to the total weight of the reinforcing fiber.

—Resin Including at Least One of Imide Bond and Amide Bond (Specific Resin)—

The specific resin according to the exemplary embodiment includes at least one of the imide bond and the amide bond. As described above, the specific resin is a resin that may cover a surface of the reinforcing fiber.

This specific resin is described in detail.

If the specific resin includes at least one of the imide bond and the amide bond in the molecule, affinity between polar groups existing on the surface of the reinforcing fiber is exhibited.

Specific types of the specific resin include the thermoplastic resin including at least one of the imide bond and the amide bond in a main chain, and specific examples thereof include polyamide (PA), polyimide (PI), polyamideimide (PAI), polyetherimide (PEI), and a ladder-type polybenzimidazole.

The specific resin may be used singly, or two or more types thereof may be used in combination.

Among these, in view of excellent adhesiveness with the reinforcing fiber and reactivity with the curable epoxy resin, polyamide (PA) is preferable.

Examples of the polyamide include polyamide obtained by co-polycondensing a dicarboxylic acid and diamine, and polyamide obtained by ring-opening co-polycondensing lactam.

Examples of the dicarboxylic acid include an oxalic acid, an adipic acid, a suberic acid, a sebacic acid, a terephthalic acid, an isophthalic acid, a 1,4-cyclohexanedicarboxylic acid, diphenyl isophthalate, chloride isophthalate, a trimellitic acid, chloride terephthalate, a pyromellitic acid, and a dimer acid. Among them, an adipic acid is preferable.

Examples of diamine include ethylenediamine, pentamethylenediamine, hexamethylenediamine, nonanediamine, dacamethylenediamine, 1,4-cyclohexanediamine, p-phenylenediamine, m-phenylenediamine, m-xylenediamine, and metaxylilenediamine. Among them, hexamethylenediamine is preferable.

Examples of lactam include ε-caprolactam, undecanelactam, and lauryllactam. Among these, ε-caprolactam is preferable.

As polyamide, in view of affinity (adhesiveness) with the reinforcing fiber and in view of moldability of the resin molded article, polyamide obtained by open-ring co-polymerizing ε-caprolactam (PA6), PA66, naylon 6T, and MXD naylon are preferable. Among these, PA66 is more preferable.

In addition, depending on a type of polyamide, there is polyamide that functions as a curing agent of a curable epoxy resin. Therefore, according to the exemplary embodiment, polyamide may be used as a component that functions as both of the specific resin and the curing agent.

Examples of the polyamide include polyamideamine which is the reactant of an aliphatic polycarboxylic acid and polyamine, and includes many amide bonds and amine in a molecule.

As polyamideamine, commercially available products may be used, and examples thereof include "ADEKA-HARDENER EH-4024W" manufactured by ADEKA Corporation and "LUCKAMIDE EA-330 and TD-960" manufactured by DIC Corporation.

The molecular weight of the specific resin is not particularly limited. However, if the specific resin is polyamide, the molecular weight thereof is preferably in the range of 500 to 100,000 and more preferably in the range of 500 to 50,000 in view of workability.

In addition, in the same manner as the molecular weight, the melting point (Tm) of the specific resin is not particularly limited, but it is preferable that the melting point is lower than the thermal curing temperature of the thermal curable epoxy resin. For example, if the specific resin is polyamide, the melting point (Tm) thereof is preferably 180° C. or lower, more preferably in the range of −50° C. to 160° C., and still more preferably in the range of −25° C. to 150° C.

Further, in view of workability, the melting viscosity of the specific resin is preferably 100 g/10 min or lower, more preferably 20,000 g/10 min or lower, and still more preferably 10,000 g/10 min or lower at 180° C. with respect to a melt flow rate (MFR).

Here, the measurement of the MFR in the specific resin is performed by the following method.

That is, the melt flow rate (MFR) is a numerical value indicating fluidity when the resin is melted and may be obtained by measuring the amount of the resin melted in a cylinder which is pushed out for 10 minutes from a die having a predetermined diameter provided on the bottom portion of the cylinder at a constant temperature and under a constant load condition.

The content of the specific resin according to the intermediate for the resin molded article according to the exemplary embodiment is preferably 0.1 parts by weight to 100 parts by weight, more preferably 0.1 parts by weight to 80 parts by weight, still more preferably 0.1 parts by weight to 60 parts by weight, and particularly preferably 0.1 parts by weight to 20 parts by weight with respect to 100 parts by weight of the curable epoxy resin.

If the content of the specific resin is in the range described above, affinity between the reinforcing fiber and the epoxy resin after curing may be obtained, and thus, the interface shearing strength and the flexural modulus may be improved.

—Curing Agent—

The intermediate for the resin molded article according to the exemplary embodiment preferably includes a curing agent for promoting curing of the curable epoxy resin.

As the curing agent, a well-known curing agent for a curable epoxy resin may be used, and may be selected depending on the use and the physical characteristics of the desired resin molded article.

Specific examples of the curing agent used together with the thermal curable epoxy resin include an amine curing agent such as aromatic amine, aliphatic amine, polyamideamine, and ketimine, a mercaptan curing agent such as polymercaptan and a sulfide resin, a resol-type or novolak-type phenol resin, and an acid anhydride such as an aromatic acid anhydride and an aliphatic acid anhydride.

Specific examples of the amine curing agent include ethylenediamine, trimethylenediamine, tetramethylenediamine, hexamethylenediamine, methaphenylenediamine, paraphenylenediamine, paraxylenediamine, 4,4'-diaminodiphenylmethane, 4,4'-diaminodiphenylpropane, 4,4'-diaminodiphenylether, 4,4'-diaminodiphenylsulfone, 4,4'-diaminodicyclohexane, bis(4-aminophenyl)phenylmethane, 1,5-diaminonaphthalene, methaxylenediamine, paraxylenediamine, 1,1-bis(4-aminophenyl)cyclohexane, and dicyanodiamide.

The curing agent may be used singly, or two or more types thereof may be used in combination.

Among these, in view of workability and costs, hexamethylenediamine is preferable.

In addition, together with a curing agent, a curing accelerating agent such as imidazole, tertiary amine, boric acid ester, a Lewis acid, an organic metal compound, an organic acid metal salts may be used.

The curing accelerating agent may be used singly, or two or more types thereof may be used in combination.

The content of the curing agent is not particularly limited and the optimum amount thereof may be different depending on a type of the thermal curable epoxy resin and a type of the curing agent.

According to the exemplary embodiment, for example, the optimum amount for each well-known curing agent is preferably used. The optimum amount is disclosed in Section 3, "Basic section in general remarks of epoxy resin" (issued by The Japan Society of Epoxy Resin Technology in 2003).

—Other Components—

The intermediate for the resin molded article according to the exemplary embodiment may include other components, in addition to the above respective components.

Examples of the component include known additives such as a flame retardant, a flame retardant auxiliary, a dripping (drip) inhibitor when the resin is heated, a plasticizer, an antioxidant, a release agent, a light stabilizer, a weathering agent, a colorant, a pigment, a modifier, an antistatic agent, a hydrolysis prevention agent, a filler, and a reinforcing agent (talc, clay, mica, glass flakes, milled glass, glass beads, crystalline silica, alumina, silicon nitride, alumina nitride, and boron nitride) in addition to the reinforcing fiber.

The content of the other components is preferably 0 parts by weight to 10 parts by weight and more preferably 0 parts by weight to 5 parts by weight with respect to 100 parts by weight of the thermoplastic resin which is the base material. Here, the expression "0 parts by weight" refers to an exemplary embodiment in which the other component is not included.

(Configuration and Form of Intermediate for Resin Molded Article)

The configuration of the intermediate for the resin molded article according to the exemplary embodiment is not particularly limited, as long as 3 components of a thermal curable epoxy resin, a reinforcing fiber, and a specific resin are included. Examples thereof include a mixture (mixed liquid) of these components, a pre-preg containing a thermal curable epoxy resin and a specific resin between reinforcing fibers (bundles, fabrics), a layered body of a reinforcing fiber and a film including a thermal curable epoxy resin and a specific resin, a layered body obtained by layering a film including a reinforcing fiber and a specific resin, and a film including a thermal curable epoxy resin and in this sequence.

Examples of the form of the intermediate for the resin molded article include a film shape, a sheet shape, and a fiber shape.

(Preparation of Intermediate for Resin Molded Article)

The intermediate for the resin molded article according to the exemplary embodiment may be prepared not only in a method of mixing respective components, but also in a well-known method such as a hand lay-up method, a filament winding method (FW method), a pultrusion method, a resin transfer molding method (RIM method), and resin film infusion.

In addition, in order to obtain a pre-preg which is an example of the intermediate for the resin molded article, a wet method in which a viscosity of a resin component to be impregnated is lowered by using a solvent, and a hot-melt method (dry method) in which a viscosity of a resin component to be impregnated is lowered by heating may be used.

In addition, the intermediate for the resin molded article according to the exemplary embodiment may be obtained by thermally curing at least a portion of the thermal curable epoxy resin.

In order to thermally cure the thermal curable epoxy resin, the intermediate for the resin molded article has a configuration in which a covering layer composed of a specific resin is formed around the reinforcing fiber, and a portion of the covering layer and a portion of the epoxy resin are bonded, as described above. Therefore, adhesiveness of the interface between the reinforcing fiber and the resin component is excellent, and decrease of the flexural modulus is prevented.

[Resin Molded Article]

The resin molded article according to the exemplary embodiment is obtained by molding the intermediate for the resin molded article according to the exemplary embodiment.

If the intermediate for the resin molded article to be used is not thermally cured or thermal curing is insufficient (an uncured portion remains), the desired resin molded article may be obtained by molding while thermal curing is performed.

If the intermediate for the resin molded article to be used is an intermediate after thermal curing (if thermal curing is sufficient), the desired resin molded article may be obtained by molding, as it is.

The molding method of the resin molded article may be determined according to the configuration and the form of the intermediate for the resin molded article to be used.

If the intermediate for the resin molded article is a liquid type, a well-known molding method which is used in the preparation of the intermediate for the resin molded article is used.

If the intermediate for the resin molded article to be used is a solid type, a molding method such as a press molding or autoclave molding is used.

In addition, when a resin molded article is obtained, processes of cutting or weaving the intermediate for the resin molded article, or the like may be performed.

The resin molded article according to the exemplary embodiment is suitably used for the use of electric and electronic equipment, business equipment, home appliances, interior materials of automobiles, containers, members of airplanes or spacecrafts, and the like.

EXAMPLES

Hereinafter, the invention is specifically described with reference to examples, but the invention is not limited to the examples.

Examples 1 to 24, Comparative Examples 1 to 9

Components (unit: g) shown in Tables 1 and 2 are stirred in a 1 L flask at 300 rpm, at 60° C. for 15 minutes, so as to obtain a resin composition.

The resin composition is injected into a mold, and carbon fibers (fabrics, "TORAYCA WOVEN FABRICS CO6142" manufactured by Toray Industries, Inc.) which are placed in the mold are impregnated with a resin composition. Thereafter, a defoaming process is performed, heating and curing are performed at 230° C. for 3 hours, press molding or cutting is performed, and thus, an ISO multipurpose dumbbell test piece (corresponding to the test of ISO178) (thickness of 4 mm and width of 10 mm of a test portion) and a D2 test piece (length of 60 mm, width of 60 mm, and thickness of 2 mm) are molded.

In the obtained test piece, the amount ratio (weight ratio) of the carbon fiber and the resin composition is 50:50.

[Evaluation]

The obtained 2 types of the test pieces are used so as to perform the following evaluation.

The evaluation results are shown in Tables 1 and 2.

—Flexural Modulus—

With respect to the obtained ISO multipurpose dumbbell test piece, a flexural modulus is measured in the method conforming with ISO178 by using a universal testing apparatus (Autograph AG-Xplus manufactured by Shimadzu Corporation).

—Interface Shearing Strength—

The adhesiveness in the interface between the reinforcing fiber and the resin component is evaluated by obtaining the interface shearing strength.

The interface shearing strength is measured by using a micro droplet method. Here, the micro droplet method is described by using the diagram of the test schematically illustrated in FIG. 1.

The micro droplet method is a method in which a liquid resin is applied to a single fiber f, a droplet D (resin drop, also referred to as resin bead) is formed, this droplet D is fixed, and a test of pulling out the single fiber f in an arrow direction is performed, so as to evaluate adhesiveness in an interface between the single fiber f and the droplet D.

Also, on the basis of this test, an interface shearing strength (τ) is calculated by using an expression below.

$$\tau = \frac{F}{d\pi L}$$

In the expression, τ represents to an interface shearing strength, F represents a pull-out load, d represents a fiber diameter of a single fiber, and L represents a droplet length.

Components (unit: g) shown in Tables 1 and 2 are stirred in a 1 L flask, at 60° C. for 15 minutes at 300 rpm, so as to obtain a resin composition.

The resin composition is applied to a carbon fiber (surface treatment is performed, TORAYCA (Registered Trademark) thread T300, manufactured by Toray Industries, Inc., a fiber diameter d: 7 μm), heating is performed at 230° C. for 3 hours to perform curing, and thus the droplet D (droplet length L: about 50 μm) is prepared.

As a measuring apparatus, an apparatus for evaluating characteristics of an interface of composite materials MODEL HM410 (Tohei Sangyo Co., Ltd.) is used, and an interface shearing strength is measured at a fiber pull-out rate of 0.1 mm/min.

Here, the interface shearing strength is an index of adhesiveness of the interface between the reinforcing fiber and the resin component. As the interface shearing strength is higher, adhesiveness of the interface between the reinforcing fiber and the resin component tends to be more excellent.

TABLE 1

| | | Example | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| Composition | Thermosetting epoxy resin 1 | 60 | 60 | 60 | 60 | 60 | 60 | 70 | 70 | 70 | 70 | 70 | 70 |
| | Curing agent 1 | 40 | 40 | 40 | 40 | | | 30 | 30 | 30 | 30 | | |
| | Curing agent 2 | | | | | | | | | | | | |
| | Specific resin 1 | | | | | 50 | 70 | | | | | 50 | 70 |
| | Specific resin 2 | 3 | 10 | | | | | 3 | 10 | | | | |
| | Specific resin 3 | | | 3 | 10 | | | | | 3 | 10 | | |
| | Total [g] | 103 | 110 | 103 | 110 | 110 | 100 | 103 | 110 | 103 | 110 | 120 | 140 |
| | Molding temperature (Curing temperature) [° C.] | 230 | 230 | 230 | 230 | 230 | 230 | 230 | 230 | 230 | 230 | 230 | 230 |
| Evaluation | Flexural modulus [Mpa] | 3.9 | 3.8 | 3.9 | 3.8 | 3.9 | 3.8 | 3.6 | 3.5 | 3.6 | 3.5 | 3.6 | 3.5 |
| | Interface shearing strength [Mpa] | 122 | 154 | 127 | 161 | 149 | 151 | 112 | 145 | 121 | 154 | 138 | 148 |

| | | Example | | | | | | | | | | | |
|---|---|---|---|---|---|---|---|---|---|---|---|---|---|
| | | 13 | 14 | 15 | 16 | 17 | 18 | 19 | 20 | 21 | 22 | 23 | 24 |
| Composition | Thermosetting epoxy resin 1 | 40 | 40 | 40 | 40 | 40 | 40 | 60 | 60 | 60 | 60 | 60 | 60 |
| | Curing agent 1 | | | | | | | | | | | | |
| | Curing agent 2 | 60 | 60 | 60 | 60 | | | 40 | 40 | 40 | 40 | | |
| | Specific resin 1 | | | | | 50 | 70 | | | | | 50 | 70 |
| | Specific resin 2 | 3 | 10 | | | | | 3 | 10 | | | | |
| | Specific resin 3 | | | 3 | 10 | | | | | 3 | 10 | | |
| | Total [g] | 103 | 110 | 103 | 110 | 110 | 110 | 103 | 110 | 103 | 110 | 110 | 130 |
| | Molding temperature (Curing temperature) [° C.] | 230 | 230 | 230 | 230 | 230 | 230 | 230 | 230 | 230 | 230 | 230 | 230 |
| Evaluation | Flexural modulus [Mpa] | 3.6 | 3.4 | 3.6 | 3.5 | 3.5 | 3.4 | 3.5 | 3.4 | 3.5 | 3.4 | 3.6 | 3.4 |
| | Interface shearing strength [Mpa] | 136 | 158 | 129 | 169 | 147 | 159 | 112 | 139 | 134 | 157 | 151 | 169 |

TABLE 2

| | | Comparative Example | | | |
|---|---|---|---|---|---|
| | | 1 | 2 | 3 | 4 |
| Composition | Thermosetting epoxy resin 1 | 60 | 70 | 40 | 60 |
| | Curing agent 1 | 40 | 30 | | |
| | Curing agent 2 | | | | |
| | Acid anhydride | | | 60 | 40 |
| | Total [g] | 100 | 100 | 100 | 100 |
| | Molding temperature (Curing temperature) [° C.] | 230 | 230 | 230 | 230 |
| Evaluation | Flexural modulus [Mpa] | 4.0 | 3.7 | 3.8 | 3.5 |
| | Interface shearing strength [Mpa] | 90 | 92 | 99 | 97 |

In addition, detailed types of the materials in Tables 1 and 2 are as follows.

—Thermosetting Epoxy Resin and Curing Agent—

Thermosetting epoxy resin 1 (jER (Registered Trademark) 828, manufactured by Mitsubishi Chemical Corporation)

Curing agent 1 (amine curing agent, jERCURE (Registered Trademark) ST11, manufactured by Mitsubishi Chemical Corporation)

Curing agent 2 (acid anhydride, jERCURE (Registered Trademark) YM306, manufactured by Mitsubishi Chemical Corporation)

—Specific Resin—

Specific resin 1 (polyamideamine (also functioning as curing agent), ADEKA HARDENER EH-4024W, manufactured by ADEKA Corporation, melting point: 5° C., viscosity at 180° C.: 1,000 (mPa·s/25° C.)

Specific resin 2 (liquid polyamide, HD-8820, Dupont, melting point: 5° C., viscosity at 180° C.: 1,200 g (mPa·s/25° C.)

Specific resin 3 (polyamide, ABRON PER1800, manufactured by ABR Organics Limited, melting point of 120° C., MFR at 180° C.: 200 g/10 min)

—Others—

Acid anhydride (YM-306, manufactured by Mitsubishi Chemical Corporation)

From the results described above, it is found that, an interface shearing strength is high and a decrease in flexural modulus is not seen in the examples, compared with the comparative examples.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An intermediate for a resin molded article, comprising:
   a curable epoxy resin;
   a reinforcing fiber; and
   a resin including at least one of an amide bond and an imide bond, and which forms a covering layer around the reinforcing fiber,
   wherein a content of the resin including at least one of an amide bond and an imide bond in the intermediate is from 0.1 to 20 parts by weight with respect to 100 parts by weight of the curable epoxy resin.

2. The intermediate for a resin molded article according to claim 1,
   wherein the resin including at least one of an amide bond and an imide bond is polyamide.

3. The intermediate for a resin molded article according to claim 2,
   wherein a melting point of the resin including at least one of an amide bond and an imide bond is lower than a thermal curing temperature of the curable epoxy resin.

4. The intermediate for a resin molded article according to claim 2,
   wherein a melting point of the resin including at least one of an amide bond and an imide bond is 180° C. or lower.

5. The intermediate for a resin molded article according to claim 1,
   wherein a melting point of the resin including at least one of an amide bond and an imide bond is lower than a thermal curing temperature of the curable epoxy resin.

6. The intermediate for a resin molded article according to claim 1,
   wherein a melting point of the resin including at least one of an amide bond and an imide bond is 180° C. or lower.

7. The intermediate for a resin molded article according to claim 1,
   wherein a weight average molecular weight of the resin including at least one of an amide bond and an imide bond is from 500 to 100,000.

8. The intermediate for a resin molded article according to claim 1,
   wherein the reinforcing fiber is a carbon fiber.

9. The intermediate for a resin molded article according to claim 1,
   wherein at least a portion of the curable epoxy resin is cured.

10. A resin molded article obtained by molding the intermediate for a resin molded article according to claim 1.

11. The intermediate for a resin molded article according to claim 1, wherein the intermediate is a layered body obtained by layering a film including the reinforcing fiber and the resin including at least one of an amide bond and an imide bond and a film including the curable epoxy resin in sequence.

12. The intermediate for a resin molded article according to claim 1,
    wherein the reinforcing fiber is a carbon fiber that has a carboxyl group on its surface.

* * * * *